United States Patent [19]
Alaphilippe

[11] Patent Number: 4,832,317
[45] Date of Patent: May 23, 1989

[54] FLUID PRESSURE DEVICES

[75] Inventor: Claude Alaphilippe, Issy-Moulineaux Cedex, France

[73] Assignee: Dunlop Limited a British Company, United Kingdom

[21] Appl. No.: 469,940

[22] Filed: Feb. 25, 1983

[30] Foreign Application Priority Data

Mar. 11, 1982 [FR] France ................ 82 04092

[51] Int. Cl.$^4$ .............................. F16F 9/32
[52] U.S. Cl. ................ 267/64.27; 156/73.1
[58] Field of Search .......... 267/64.27, 64.28, 64.19, 267/64.21, 64.23, 64.24, 35; 188/298; 156/73.1, 73.5; 285/226–228; 74/18.2; 277/200, 212 FB; 92/34, 168, 168 B, 34, 40–44, 46, 47

[56] References Cited

U.S. PATENT DOCUMENTS

| | | | |
|---|---|---|---|
| 3,321,200 | 5/1967 | Polhemus et al. | 267/64.27 |
| 3,444,018 | 5/1969 | Hewitt | 156/73.5 |
| 3,462,803 | 8/1969 | Horton | 156/73.1 |
| 4,222,974 | 9/1980 | Smith | 156/73.5 |
| 4,231,824 | 11/1980 | Cooper | 156/73.1 |

FOREIGN PATENT DOCUMENTS

| | | | |
|---|---|---|---|
| 7011090 | 1/1972 | Netherlands | 156/73.5 |
| 820983 | 9/1959 | United Kingdom . | |
| 819728 | 9/1959 | United Kingdom . | |
| 873348 | 7/1961 | United Kingdom . | |
| 0907555 | 10/1962 | United Kingdom | 267/64.27 |
| 1309750 | 3/1973 | United Kingdom . | |
| 1592306 | 7/1981 | United Kingdom . | |

Primary Examiner—Duane A. Reger
Attorney, Agent, or Firm—Stevens, Davis, Miller & Mosher

[57] ABSTRACT

A fluid-pressure device for example a bellows-type spring, in which a terminal portion of the spring is compressed between an end member (4) and an annular pressure piece (11) to provide a fluid-tight seal and an additional fluid-tight seal is provided by welding mutually opposed joint surfaces (16,13) of the end member and the annular pressure piece. The end member and the pressure piece may be of thermoplastic material and welded together by ultrasonic or friction welding.

12 Claims, 1 Drawing Sheet

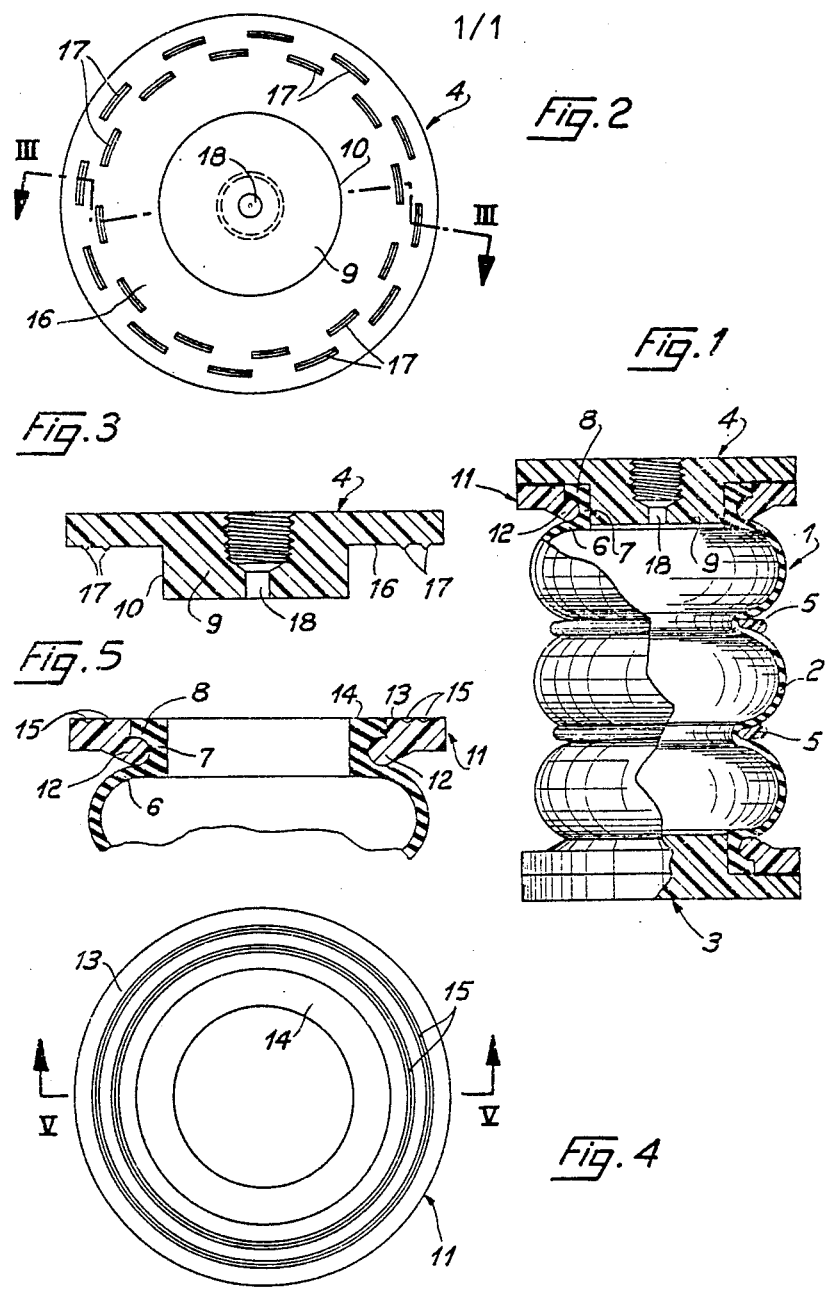

FLUID PRESSURE DEVICES

The present invention relates to fluid pressure devices, such as springs, jacks, or shock or vibration absorbers.

U.K. Pat. No. 907,555 describes fluid pressure devices of the type comprising a hollow flexible member which is impervious to fluids, the two ends of which are associated respectively with two end members which are movable relative to one another. The flexible member has at least one end portion compressed in a fluid-tight manner between a part of the corresponding movable end member and a part of an annular pressure piece, connected by fixing means to the corresponding movable end member.

In known devices of this kind, the movable end member, for example an end plate, and the annular pressure piece are metallic elements, connected by mechanical means such as bolts passing through holes provided for that purpose in the elements, nuts being screwed on the threaded ends of the bolts.

The fitting of these different mechanical connection means necessitates the use of special tools, and constitutes a great limitation on increasing the rate of production, because of the time necessary for accomplishing the fitting operations. In addition, these mechanical means cost a not inconsiderable amount.

By the present invention it is proposed to reduce the cost of these devices, by simplifying their structure, and, in particular, by abolishing the mechanical assembly means such as screws, bolts or other clamping mechanisms, without modifying the technical performances of the known devices on the market.

To this end, in accordance with the invention, a fluid pressure device comprises a fluid-tight flexible member having a terminal portion secured fluid-tightly in compression between an end member and an annular pressure piece, the end member and the annular pressure piece having in addition mutually opposed joint surfaces which are united together to provide a relatively rigid fluid-tight joint therebetween and to secure the flexible member to the end member.

More specifically, and in accordance with the invention, the annular pressure piece and the corresponding end member are elements made from plastics material, more especially from injected thermoplastic material, the joint surfaces of which have a general direction situated in one plane or in parallel planes, and these elements are welded to one another by their joint surfaces.

The invention also provides a method of assembling a fluid pressure device comprising securing a terminal portion of a flexible member in fluid-tight compression between an end member and an annular pressure piece both of which are formed from a thermoplastic material and have mutually opposed joint surfaces, and welding together the mutually opposed joint surfaces to provide a relatively rigid joint therebetween.

This assembly by welding of two elements made of thermoplastic material, previously connected mechanically, contributes a double advantage: the fluid-tightness effected between the end member and the corresponding annular pressure piece is added to the fluid-tightness effected at the compressed terminal portion of the flexible member between the end member and the corresponding annular pressure piece. The integralization by welding of the thermoplastic elements therefore does not appear as an equivalent means of integralization, substituted for the mechanical integralization device previously used, since the solution in accordance with the invention contributes original results.

To the knowledge of the applicants, the technique of welding has not previously been applied to the fixing together of thermoplastic elements of this kind which are constantly stressed by mechanical loads, constant or variable as a function of the temperature and the pressure. The other advantage, which stems from the one which has just been presented, is that the device in accordance with the invention can be inflated under load without it being necessary to provide additional mechanical connections between the two movable end members provided at the ends of the device and the respective annular pressure pieces, contrary to what was necessary with the previous devices.

In a preferred embodiment, the bearing surface of one of the elements has at least one portion in relief and/or at least one cavity, while the bearing surface of the other element has respectively at least one cavity and/or at least one portion in relief, of a shape at least partially complementary to that respectively of the portion or portions in relief and of the cavities of the other element, so as to bring about interlocking joint surfaces assembled by welding.

Preferably, the joint surfaces are annular surfaces, in one at least of which there is formed at least one groove, extending at least over an arc of a circle, and receiving at least one tongue jutting out on the other annular joint surface and extending over a more limited circular arc.

Depending on the choice of the plastic material or materials used to constitute on the one hand the annular pressure piece and on the other hand the corresponding movable end member, and depending on the dimensions of these elements, these latter may be welded by ultrasounds, in known 'per se' manner.

However, in another embodiment, the joint surface on each element has a geometry allowing, before welding and in the course of welding, an alternating or oscillatory relative displacement or a relative vibration of the two elements, so that the elements can be welded by friction or vibration.

Preferably, in this case, the joint surfaces are coaxial revolution surfaces, so that the elements are made integral by welding by angular vibration or friction.

When the fluid pressure device is of the kind described in the aforesaid U.K. Patent Specification No. 907,555, that is to say of the kind in which in addition the said terminal portion of the flexible member has an axial annular part and a radial part, which, when the device is under pressure, is applied in a fluid-tight manner by the annular pressure piece against a radial part of the corresponding movable member, it is advantageous that, in accordance with the invention, the joint surfaces of the two welded elements are substantially radial surfaces, of which that of the annular pressure piece is substantially in extension of the end surface, turned towards the outside of the device, of the radial part of the terminal portion of the flexible member.

This affords the advantage that, prior to the welding of the corresponding movable member onto the annular pressure piece, the corresponding terminal portion of the flexible member is protected.

A pressure device in accordance with the invention may be of the kind in which the annular pressure piece is provided with an internal peripheral lip compressing on the one hand the radial part of the terminal portion of the flexible member against the radial part of the corresponding movable member, and on the other hand the axial annular part of this same terminal portion against a substantially axial part of the same movable member, when the device is under pressure, as described and illustrated in the aforesaid U.K. Patent Specification No. 907,555.

In a construction of this kind it is preferable, in accordance with the invention, for the internal peripheral lip to have a substantially toric shape, and to be fastened, by a part of its surface opposite to the one coming into contact with the terminal portion of the flexible member, to the body of the annular pressure piece, which takes the shape of a ring of rectangular section. This allows an excellent positioning of the terminal portion of the flexible member around the internal peripheral lip of the pressure piece, which is in this case of a simplified structure.

Finally, if the fluid pressure device in accordance with the invention is of the kind in which the fluid-tight flexible member has a substantially cylindrical shape and consists of a bellows having at least one undulation, as is also the case in the afore-said U.K. Patent Specification No. 907,555, the movable end member then constitutes a fluid-tight bellows closure plate, equipped with an orifice intended to receive a filling and/or closing valve. The closure plate may be provided with a cylindrical central boss, coaxial to the bellows, and facing towards the interior of the bellows, and against the external lateral surface of which the axial annular part of the terminal portion of the bellows is compressed in a fluid-tight manner by the annular pressure piece. The external lateral surface of the axial boss may merge together with a radial surface, facing towards the interior of the bellows, of the radial part of the fluid-tight closure plate, and against which the radial part of the terminal portion of the bellows is compressed in a fluid-tight manner by the annular pressure piece, the said radial surface of the radial part of the fluid-tight closure plate being extended radially towards the interior by the joint surface of this same plate. This embodiment has the advantage that the two elements, namely the fluid-tight closure plate, and the annular pressure ring, have simple shapes, and that they can be assembled by welding along surfaces which surround the terminal portion of the bellows.

However, in order to obtain a fluid-tight assembly of a better quality between these two elements, at least two assemblies of non-adjacent tongues, disposed along at least two concentric circles, such that each tongue of an assembly extends over a circular arc corresponding to that separating two neighbaring tongues of the other assembly or assemblies, jut out on one of the joint surfaces and are fitted into at least two concentric circular grooves, formed in the other joint surface, and serving at the same time as sprues to receive molten plastic during welding.

One embodiment of the invention will now be described with reference to the accompanying drawings, in which:

FIG. 1 is a view in side elevation, partially sectioned, of a device in accordance with the invention, ready to be used;

FIG. 2 is a bottom view of the upper fluid-tight closure plate of the device in accordance with FIG. 1;

FIG. 3 is a sectional view along the line III—III of FIG. 2;

FIG. 4 is a top view of the upper annular pressure ring and of the corresponding upper terminal portion of the bellows of the device in accordance with FIG. 1, and FIG. 5 is a section along the line V—V of FIG. 4.

The device illustrated in FIGS. 1 to 5 comprises a bellows 1 made of rubber or of a similar elastic material, possibly reinforced with a reinforcement made of textile cord fabric, and having a triple undulation, that is to say it comprises three lobes 2 integral with one another, aligned axially and of identical dimensions. The bellows 1 is disposed between a lower fluid-tight closure plate 3, intended to be fixed to a non-suspeded member if the device is for example used in a suspension installation, and an upper fluid-tight closure plate 4, intended to be fixed to a suspended member of the suspension installation. Toruses 5, made of a rigid plastic material, are each disposed around one of the two sunken parts between two adjacent lobes 2, to avoid any major misalignment of the bellows in service. The upper end and the lower end of the bellows 1, as well as the corresponding lower 3 and upper 4 fluid-tight closure plates are identical, and, consequently, only the upper part of the device is described hereinafter.

The flexible upper wall 6 of the bellows 1 is directed substantially radially towards the interior of the bellows 1, that is to say towards the vertical axis of symmetry of the device, and this flexible upper wall 6 is joined to an annular part 7, extending axially upwards, the interior periphery of which is cylindrical. The upper end of this axial annular part 7 has an annular flange 8, directed radially outwards, and which can possibly end in an annular lip (not shown) descending towards the flexible upper wall 6 of the bellows 1, defining with this wall 6 and the axial annular part 7 an annular cavity. The axial annular part 7, the radial annular flange 8 and the possible lip form together a bead of the bellows 1, and this bead is flexible and deformable and possibly comprises a reinforcing ring, for example made of glass fibres.

The upper fluid-tight closure plate 4, with which this bead is associated, is cylindrical with a circular section, and it has in its centre a boss 9, substantially cylindrical, which extends from this plate 4 towards the interior of the bellows 1, and is coaxial with this latter. The external lateral surface 10 of this boss 9, which forms a seat for the internal periphery of the axial annular part 7 of the bead, is advantageously very slightly conical, so that the lower part of the boss as seen in FIG. 3 has a diameter which is slightly smaller than its upper part, its dimensions being such that this external lateral surface establishes a fluid-tight contact by wedging with the annular axial part 7 of the bead of the bellows 1.

An annular pressure ring 11 has an internal peripheral edge provided with an annular lip 12, of toric shape, fastened to the rectangular-section body portion of the ring 11 substantially on a level with the lower annular radial surface, facing towards the interior of the bellows 1, of the ring body 11. Thus the annular radial surface 13 of the ring 11 facing towards the exterior of the bellows 1 is situated in the plane of the external radial surface 14 of the annular radial flange 8 of the bead when the lip 12 of the pressure ring 11 is received in the annular cavity defined by the flexible upper wall 6, the axial annular part 7 and the radial flange 8 of the bellows, following the fitting of the pressure ring 11 around the bead of the bellows and before the bellows receives the upper fluid-tight closure plate 4. This is easily obtained by deforming radially inwardly the annular flange 8 and any lip with which it may be provided. Two concentric circular grooves 15 coaxial with the bellows 1 are formed in the radial surface 13 of the ring 11.

The radial annular surface 16 of the upper fluid-tight closure plate 4, facing towards the interior of the bellows 1, has two assemblies of tongues 17, in relief, disposed along two concentric circles of equal radii to the circular grooves 15 of the ring 11. Each assembly has twelve tongues 17, non-adjacent, extending over equal angular arcs of the order of 15°, and equidistant from one another. The tongues 17 of the two assemblies occupy staggered positions, that is to say one tongue 17 of an assembly extends in a circular sector corresponding to a space between two neighbouring tongues 17 of the other assembly, as is shown in FIG. 2.

Each tongue 17 has a cross-section in the shape of an isosceles triangle, with an angle at the apex of 90°, its height being 0.6 mm and its base 1.2 mm for example.

The upper fluid-tight closure plate 4 has in addition a partially-threaded central passage 18 for the fitting of an inflation and closure valve.

The fluid-tight closure plates 3 and 4 as well as the pressure rings, such as 11, are made from an injected or moulded thermoplastic material, for example, a polyamide, such as the one marketed under the name of Nytralon, possibly reinforced with fibres.

After having fitted the ring 11 around the bead of the upper end of the bellowos 1, the upper fluid-tight closure plate 4 is placed in position, so that the boss 9 penetrates into the axial annular part 7 of the bellows 1 and the radial surface 16 of the plate 4 comes opposite the radial surface 13 of the ring 11, the tongues 17 lodging in the grooves 15. The effect is thus obtained that the axial annular part 7 and the radial flange 8 of the bellows 1 are compressed respectively against the external lateral surface 10 of the boss 9 and the radial surface 16 of the plate 4, constituting respectively a primary joint zone and a secondary joint zone tight to the fluid introduced through the passage 18 of the plate 4 for the inflation of the bellows 1.

Then the plate 4 and the ring 11 are pressed against one another, under a controlled pressure, by their respective bearing surfaces 16 and 13, and one proceeds to their integraligation by welding with ultrasounds or by welding by friction (also called welding by vibrations).

The ultrasonic welding of thermoplastic materials is a well-known process, about which it will merely be recalled that it consists of the production of sound waves converted into mechanical vibrations having a high frequency, which, by friction, develop a certain heat softening the thermoplastic material of the parts applied against one another, so that this material, in cooling down, solidifies and welds the parts to one another. This process, rapid and sure, and consuming only a little energy, allows very rapid production cycles.

The joint plane, defined by the bearing surfaces or joint surfaces 13 and 16 respectively of the ring 11 and of the plate 4, is well formed and makes it possible to obtain, after welding, a joint tight to the inflation fluid of the bellows 1 since the contact surfaces 13 and 16 are of sufficient size and rigidity, and the tongues 17 and the grooves 15 define a mortice joint offering great resistance and excellent tightness.

By way of variation, one could in a similar manner arrange the elements to be welded together to allow an ultrasonic welding at centre-points instead of in arcuate zones.

The assembly can immediately, even in the course of the welding, support a maximum compressive load, and has a good mechanical hold. The finished joint resists traction well.

Almost identical performances are obtained by using welding by friction, also called welding by vibrations, about which it will merely be recalled that it consists of utilizing the heat released by the friction of two elements made of plastics material, more particularly of thermoplastic material, pressed against one another and moved with an alternating movement at a frequency of the order of 100 Hz and of an amplitude of 2 to 4 mm. The rubbing in contact of the two elements develops heat, which causes the thermoplastic material to melt and leads to the welding of the two elements, immobilized in their desired final relative position. The geometry of the annular joint surfaces 13 and 16 allows a relative displacement in alternating rotation of the plate 4 and of the ring 11, along an arc of a circle centred on the axis of the bellows 1 and in the plane of the joint defined by the surfaces 13 and 16, with a guidance in rotation because of the fitting of the tongues 17 into the grooves 15 so that these two elements can thus be made integral by welding or by angular friction, the weld joint having a radius which is practically constant in relation to the centre of rotation, taken on the axis of the bellows 1. Friction welding is more satisfactory than ultrasonic welding in the case of a device of large dimension, more particularly when the closure plates have a large diameter.

By use of the principles of construction described above one thus obtains fluid-tight assemblies, stable over time, and the circular grooves 15 constitute also sprues for the material in fusion emanating from the tongues 17, when the surfaces 13 and 16 are compressed against one another.

The devices obtained in this way, of equivalent performance and at a cost price which is much lower than conventional assemblies such as those marketed in previous years by the applicant firm under the name of PNEURIDE, can be advantageously substituted for these latter, in all the applications which they have received, more especially:

Rotating, linear, jacks, more especially for tipping of conveyor waggons, for presses having direct action, plate presses, die presses, for load elevators, pulley blocks and elevator bridges;

springs, e.g. for vehicles;

shock deadeners or absorbers, such as end bump stops for roller bridges, deadeners or absorbers of vibrations; suspensions or mountings for machines;

mechanisms of alternating entrainment, more especially for winders of pipes, cables cords . . . ;

sluice motorization mechanisms, and garage tools, such as pneumatic jacks and tire levers.

Having now described the invention, what I claim is:

1. A fluid pressure device comprising a fluid-tight flexible member having a terminal portion secured fluid-tightly in compression between an axially extending portion of a thermoplastic end member and a thermoplastic annular pressure piece, the end member and the annular pressure piece each having, in addition, radially extending mutually opposed joint surfaces which are welded together to provide a "relatively" rigid fluid-tight joint therebetween and to secure the flexible member to the end member.

2. A device according to claim 1 wherein the joint is formed between joint surfaces on the respective elements which comprise a portion in relief on one element and a complementary cavity in the other element to provide a mortice joint in the welded assembly.

3. A device according to claim 2 wherein the joint surfaces are annular and one such surface comprises a groove extending in a circular arc and the other surface comprises a projecting tongue arranged to engage in said groove and to extend along a more limited circular arc.

4. A device according to claim 3 wherein the joint comprises at least two tongue and groove assemblies extending around concentric circles of different diameter and staggered so that a tongue of one assembly extends in a circular sector corresponding to a space between two tongues of the other assembly.

5. A device according to claim 1 wherein the joint surfaces are coaxial surfaces of revolution.

6. A device according to claim 1 wherein the terminal portion of the flexible member has an axial annular part 7 and a radial part 0 which, when the device is under pressure, is applied by the annular pressure piece 11 in fluid-tight engagement against a radial part of the corresponding end member, wherein the joint surfaces of the two elements are substantially radial surfaces and the said radial surface of the annular pressure plate lies substantially in extension of the outwardly facing end surface of the radial part of the terminal portion of the flexible member.

7. A device according to claim 6 wherein the annular pressure piece comprises an internal peripheral lip arragned when the device is under pressure to compress the radial part of the terminal portion of the flexible member against the radial part of the corresponding end member and also to compress the axial annular part of the said terminal portion against a substantially axial part of the end member, the internal peripheral lip having a substantially toric shape.

8. A device according to claim 6 wherein the flexible member is a bellows of substantially cylindrical shape and the end member comprises a fluid-tight closure plate having a cylindrical central boss inserted into the associated terminal portion of the bellows to provide an external lateral surface of the boss against which the axial annular part of the terminal portion of the bellows is fluid-tightly compressed by the annular pressure piece, wherein the said external lateral surface of the boss connects with a radial surface of the closure plate facing towards the interior of the bellows and against which radial surface of the closure plate the radial part of the terminal portion of the bellows is fluid-tightly compressed by the annular pressure piece, the said radial surface of the closure plate being extended radially outwards by the joint surface of the end member.

9. A device according to claim 1 wherein the flexible member has two terminal portions and is provided with an end member and annular pressure piece for each terminal portion.

10. A method of assembling a fluid pressure device comprising securing a terminal portion of a flexible member in fluid-tight compression between an end member and an annular pressure piece both of which are formed from a thermoplastic material and have mutually opposed joint surfaces, and welding together the mutually opposed joint surfaces to provide a relatively rigid joint there-between.

11. A method according to claim 10 wherein the welding is carried out by ultrasonic means.

12. A method according to claim 10 wherein the welding is carried out by friction.

* * * * *